United States Patent
Wolfe

(10) Patent No.: US 7,306,421 B2
(45) Date of Patent: Dec. 11, 2007

(54) INSIDE VEHICLE LIFT

(76) Inventor: Clifford L. Wolfe, 62 Maple Avenue, Smiths Falls (CA) K7A 2A7

( * ) Notice: Subject to any disclaimer, the term of this patent is extended or adjusted under 35 U.S.C. 154(b) by 68 days.

(21) Appl. No.: 10/712,016

(22) Filed: Nov. 14, 2003

(65) Prior Publication Data

US 2005/0105994 A1    May 19, 2005

(51) Int. Cl.
*B60P 1/46* (2006.01)
*A61G 3/02* (2006.01)
*A61G 3/08* (2006.01)

(52) U.S. Cl. .................... 414/541; 414/540; 414/921

(58) Field of Classification Search ............... 414/439, 414/440, 441, 446, 449, 522, 539, 540, 541, 414/542, 544, 545, 546, 549, 921
See application file for complete search history.

(56) References Cited

U.S. PATENT DOCUMENTS

| | | | | |
|---|---|---|---|---|
| 586,641 | A * | 7/1897 | Underwood | 414/541 |
| 3,351,220 | A * | 11/1967 | Kirkbride | 414/541 |
| 3,622,026 | A * | 11/1971 | Tornheim | 414/486 |
| 4,023,690 | A * | 5/1977 | Goode | 414/24.5 |
| 4,573,854 | A * | 3/1986 | McFarland | 414/462 |
| 4,616,972 | A * | 10/1986 | McFarland | 414/749.1 |
| 4,634,336 | A * | 1/1987 | Pearce | 414/546 |
| 4,685,860 | A * | 8/1987 | McFarland | 414/720 |
| 4,778,327 | A * | 10/1988 | Tufenkian et al. | 414/541 |
| 4,907,936 | A * | 3/1990 | Bourdage | 414/545 |
| 4,948,326 | A * | 8/1990 | Bedard | 414/541 |
| 5,052,879 | A * | 10/1991 | Wolfe | 414/541 |
| 5,380,144 | A | 1/1995 | Smith et al. | |
| 5,618,150 | A * | 4/1997 | Poindexter | 414/477 |
| 5,651,657 | A * | 7/1997 | Poindexter | 414/541 |
| 5,810,547 | A | 9/1998 | Bruno et al. | |
| 5,853,282 | A | 12/1998 | Bechler et al. | |
| 6,019,567 | A * | 2/2000 | Lutkus et al. | 414/549 |
| 6,062,805 | A * | 5/2000 | Tremblay et al. | 414/540 |
| 6,238,169 | B1 * | 5/2001 | Dupuy et al. | 414/546 |
| 6,547,507 | B1 | 4/2003 | Gest et al. | |
| 6,616,396 | B2 | 9/2003 | Sternberg | |
| 6,739,824 | B2 * | 5/2004 | Dupuy et al. | 414/546 |
| 6,821,078 | B2 * | 11/2004 | Dudai et al. | 414/546 |
| 7,232,285 | B1 * | 6/2007 | Ruch | 414/542 |

(Continued)

OTHER PUBLICATIONS

"4300-BP Backpacker Inside Lift", Scooter Lift Manufacturing, http://www.planetmobility.com; Oct. 26, 2003, webpages 1-2.

*Primary Examiner*—Saul Rodriguez
*Assistant Examiner*—Charles Greenhut
(74) *Attorney, Agent, or Firm*—Freedman & Associates

(57) ABSTRACT

The present invention relates to an inside vehicle lift for transferring a load through a rear door opening of a vehicle. The lift comprises a load platform for receiving the load. The load platform is horizontally movable between a loading position with the load platform being disposed behind a rear bumper of the vehicle and a transport position inside the vehicle. Lift actuators move vertically a lift support base with the load platform between a first vertical position with the load platform being in close proximity to ground and a second vertical position suitable for horizontally moving the load platform into the vehicle. The inside vehicle lift is highly beneficial for installation in minivans and SUVs enabling loading of a large number of different commercially available scooters.

13 Claims, 9 Drawing Sheets

U.S. PATENT DOCUMENTS

2001/0026756 A1* 10/2001 Mortimore .................. 414/556
2002/0081184 A1    6/2002 Sternberg
2004/0101391 A1*  5/2004 Dudai et al. ................. 414/541
2005/0105995 A1*  5/2005 Freet et al. .................. 414/541

* cited by examiner

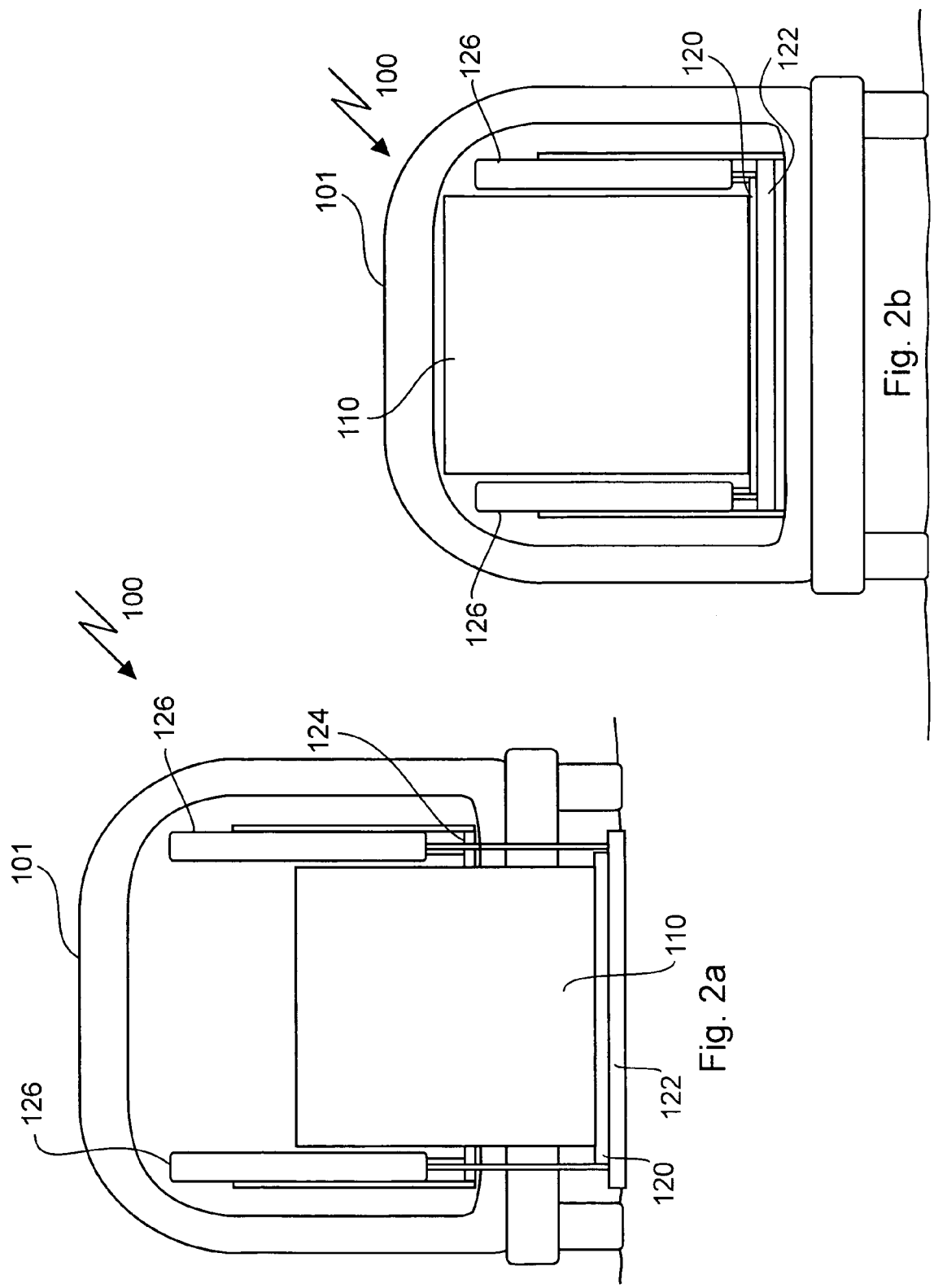

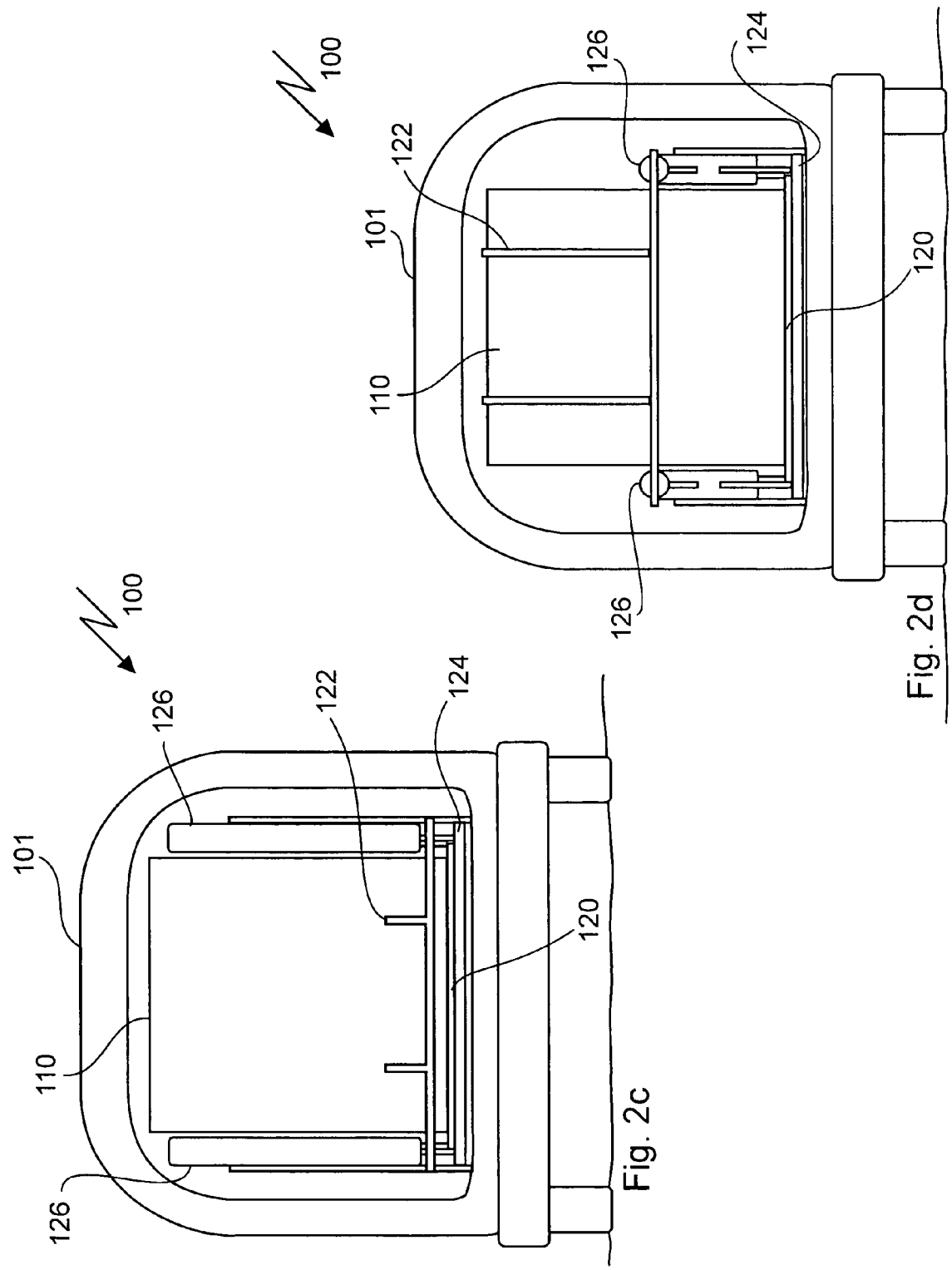

INSIDE VEHICLE LIFT

FIELD OF THE INVENTION

This invention relates to mobile lifts attached to vehicles and in particular to inside lifts for lifting a load through a rear door opening of a vehicle.

BACKGROUND OF THE INVENTION

Personal mobility vehicles have gained widespread acceptance for use by elderly persons or persons with partial disabilities. Self-propelled scooters are among the most popular personal mobility vehicles. As the use of scooters has increased, so has the need to transport such scooters to remote locations. Many new vehicles such as minivans and SUVs have a rear door opening and the interior size of these vehicles allows transportation of numerous small sized vehicles such as scooters, all terrain vehicles, riding lawn mowers, motorcycles, etc. The loading and transportation of scooters presents numerous problems. Transporting a scooter, which often weighs more than the user, requires its placement inside the storage area of the transport vehicle. Manually lifting a scooter into a transport vehicle is an arduous if not impossible task especially for elderly or partially handicapped persons. To overcome these problems various lift and ramp systems have been designed. Examples of such lifting system include hoists or cranes mounted to a vehicle as disclosed, for example, in U.S. Pat. No. 5,810,547 issued to Bruno et al. 22 Sep. 1998, in U.S. Pat. No. 5,853,282 issued to Bechler et al. 29 Dec. 1998 and in U.S. Pat. No. 6,547,507 issued to Gest et al. 15 Apr. 2003. Special care has to be taken by the user to properly position and secure the scooter as well as the lift in order to prevent damage to the rear door. Unfortunately, such lift systems require substantial user strength for manually maneuvering the scooter into the proper position within the vehicle. Other examples include ramp systems as disclosed, for example, in U.S. Pat. No. 5,380,144 issued to smith et al. 10 Jan. 1995, in U.S. Pat. No. 6,616,396 issued to Sternberg 9 Sep. 2003, and in U.S. patent application 2002/0081184 by Sternberg published 27 Jun. 2002. However, loading a scooter using a ramp is also an arduous task. Due to the limited height of the vehicle—minivan or SUV—a user has to bend forward substantially when driving a scooter via the ramp into or out of the vehicle. To overcome this problem Sternberg discloses a ramp having a hoist for pulling the scooter into the vehicle. However, the user is still left with the problem of driving or manually unloading the scooter out of the vehicle onto the ramp. Furthermore, in order to provide a sufficiently small slope ramp systems need a large space behind the vehicle for disposing the ramp and driving the scooter thereon. Another disadvantage of most of these prior art devices are the substantial work and modifications required for installing the same in a vehicle. The above problems are partly overcome by the "4300-BP Backpacker Inside Lift" produced by Scooter Lift Manufacturing. A platform for loading a scooter is vertically lifted by a lift arm and then the lift arm together with the platform is moved horizontally into the vehicle. However, this type of lift has substantial restrictions concerning the size of scooter it is capable to load. Firstly, the lift arm in the center requires a substantial amount of the space in the rear of the vehicle such that the scooter is oriented across the driving direction of the vehicle in order to be able to accommodate the lift arm as well as the scooter. Thus, the width of the vehicle puts a severe restriction onto the length of the scooter. Secondly, translationally moving the lift arm requires a drive mechanism strong enough to support the moments induced when the lift arm is used for lifting the platform with the scooter. Thus, the dimension of the drive mechanism substantially raises the height of the platform above the vehicle floor necessitating the backrest of the scooter to be collapsed.

In light of the prior art it would be highly advantageous to provide an inside vehicle lift that overcomes the drawbacks of the prior art by maximizing the space provided for the load in the rear of the vehicle, being easily operated, and being easily installed without substantial modifications to the vehicle.

SUMMARY OF THE INVENTION

It is, therefore, an object of the invention to provide an inside vehicle lift comprising a load platform for being vertically moved outside the vehicle and translationally moved into the vehicle that maximizes the space provided for the load in the rear of the vehicle.

It is further an object of the invention to provide an inside vehicle lift that is easily operated.

It is yet further an object of he invention to provide an inside vehicle lift that is easily installed without substantial modifications to the vehicle.

In accordance with the present invention there is provided an inside vehicle lift for transferring a load through a rear door opening of a vehicle comprising:

a load platform for receiving the load, the load platform being horizontally movable between a loading position with the load platform being disposed behind a rear bumper of the vehicle and a transport position inside the vehicle;

a base for being attached inside the vehicle to a vehicle floor such that a rear end of the base is located in proximity to the rear door opening;

a lift unit comprising a lift support base for supporting the load platform when disposed outside the vehicle, the lift support base being mechanically connected at a left hand side and at a right hand side to a left hand side lift actuator and a right hand side lift actuator, respectively, the lift actuators for vertically moving the lift support base with the load platform between a first vertical position with the load platform being in close proximity to ground and a second vertical position suitable for horizontally moving the load platform into the vehicle; and, a left hand side gear mechanism in mechanical communication with a left hand side of the base and the left hand side lift actuator and a right hand side gear mechanism in mechanical communication with a right hand side of the base and the right hand side lift actuator, respectively, the left hand side gear mechanism and the right hand side gear mechanism for providing translational and rotational movement of the lift unit through the rear door opening of the vehicle between a first position inside the vehicle with the lift support base being disposed in proximity to the rear door opening and oriented substantially vertical and a second position outside the vehicle with the lift support base being disposed behind the rear bumper and oriented substantially horizontal.

In accordance with the present invention there is further provided a method for transferring a load through a rear door opening of a vehicle comprising:

disposing a load platform supported by a lift support base behind a rear bumper of the vehicle with the load platform being in close proximity to ground, the lift support base being mechanically connected at a left hand side and at a right hand side to a left hand side lift actuator and a right hand side lift actuator, respectively, the left hand side and the right hand side lift actuator being in mechanical communication with a left hand side and a right hand side of a base via a left hand side gear mechanism and a right hand side gear mechanism, respectively, the base being attached inside the vehicle to a vehicle floor such that a rear end of the base is located in proximity to the rear door opening;

disposing the load on the load platform;

using the left hand side and the right hand side lift actuator lifting the lift support base with the load platform to a vertical position suitable for horizontally moving the load platform into the vehicle;

translationally moving the load platform with the load through the rear door opening from the lift support base into the vehicle; and, translationally and rotationally moving the lift support base and the lift actuators through the rear door opening to a position inside the vehicle where the lift unit is disposed in proximity to the rear door opening and oriented substantially vertical.

The inside vehicle lift according to the invention is highly beneficial for installation in minivans and SUVs by providing simple installation using existing seat couplers, maximizing the size of the load and through light weight construction capabilities also maximizing the weight of the load. Thus enabling loading of a large number of different commercially available scooters without collapsing the backrest into minivans and SUVs. Furthermore, provision of an installation support unit according to the invention enables installation/un-installation of the inside vehicle lift by a single user.

BRIEF DESCRIPTION OF THE FIGURES

Exemplary embodiments of the invention will now be described in conjunction with the following drawings, in which:

FIGS. 2a to 2d are simplified block diagrams schematically illustrating a rear view of the preferred embodiment shown in FIGS. 1a to 1d in corresponding stages of operation;

DETAILED DESCRIPTION OF THE INVENTION

Figure 1A:
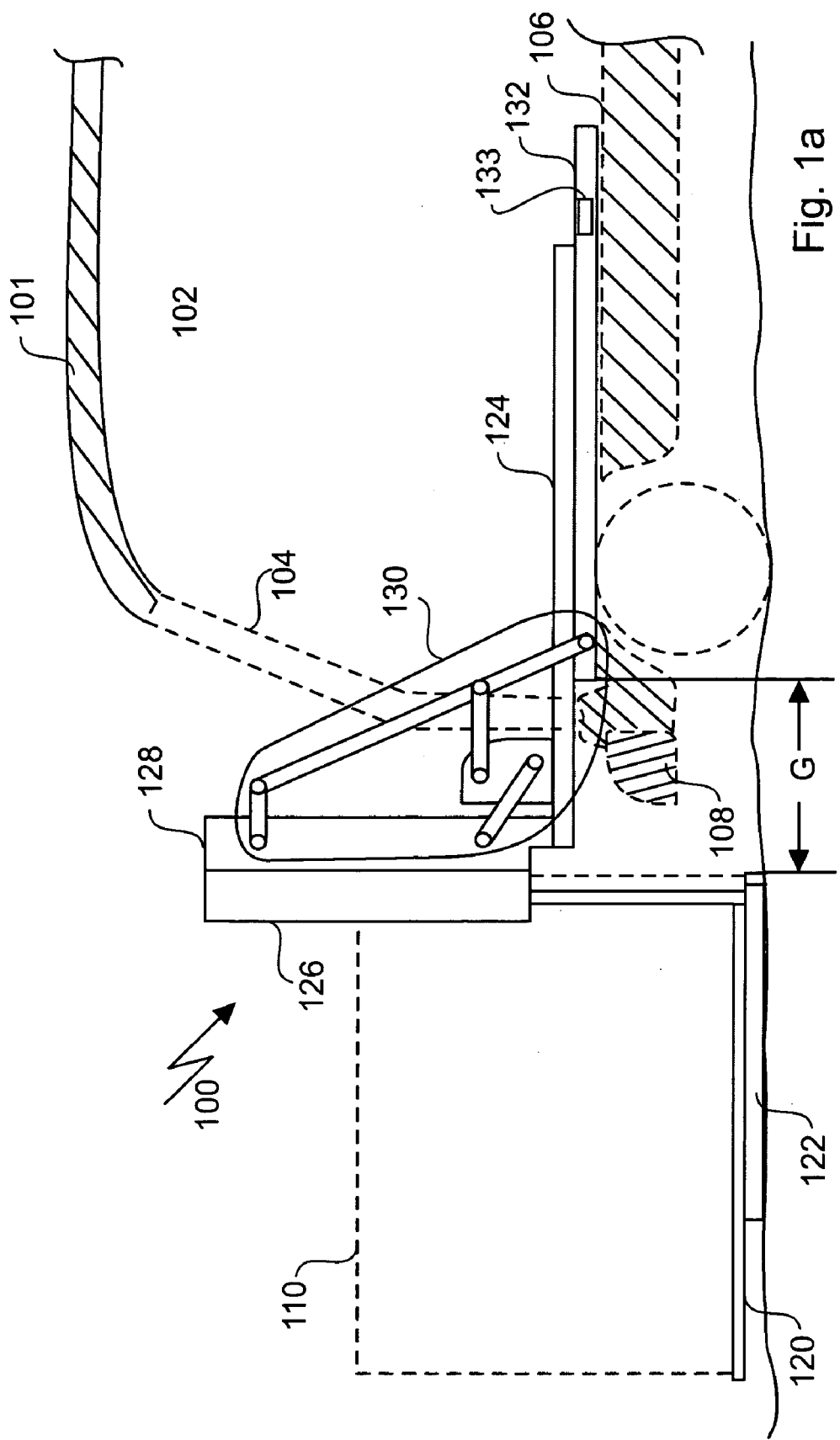
FIGS. 1a to 1d are simplified block diagrams schematically illustrating a side view of a preferred embodiment of an inside vehicle lift according to the invention in various stages of operation.
Figure 1B:
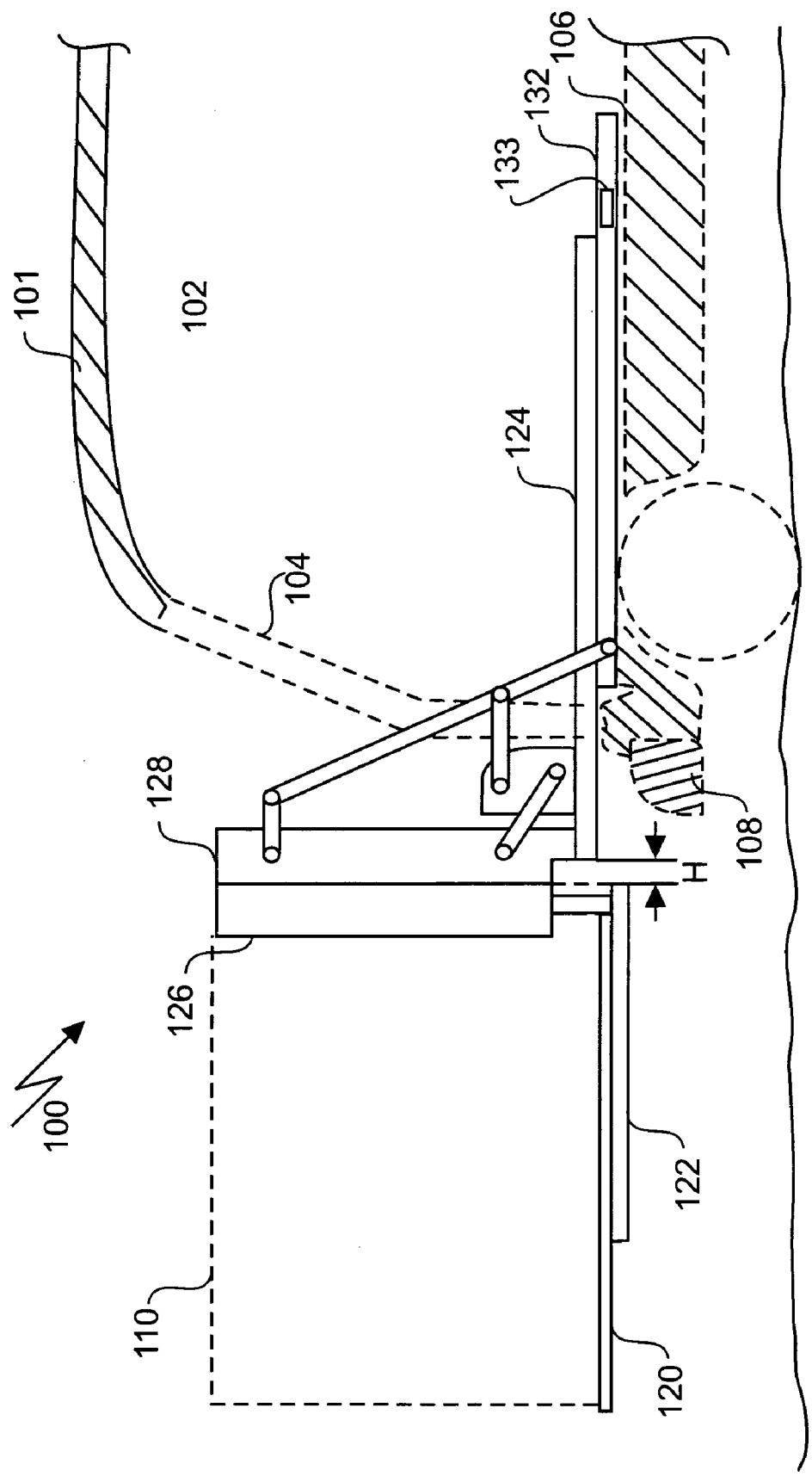
Figure 1C:
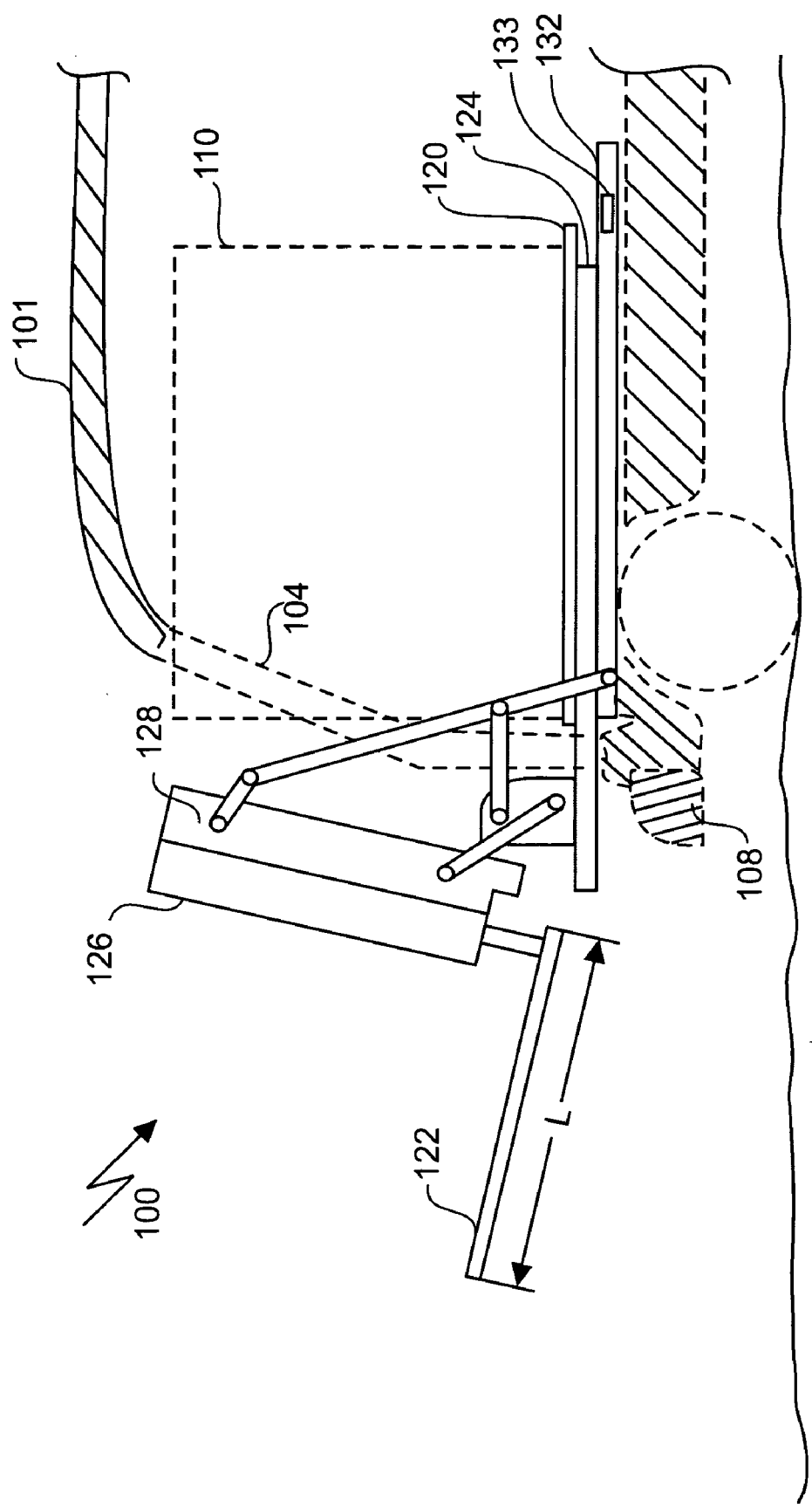
Figure 1D:
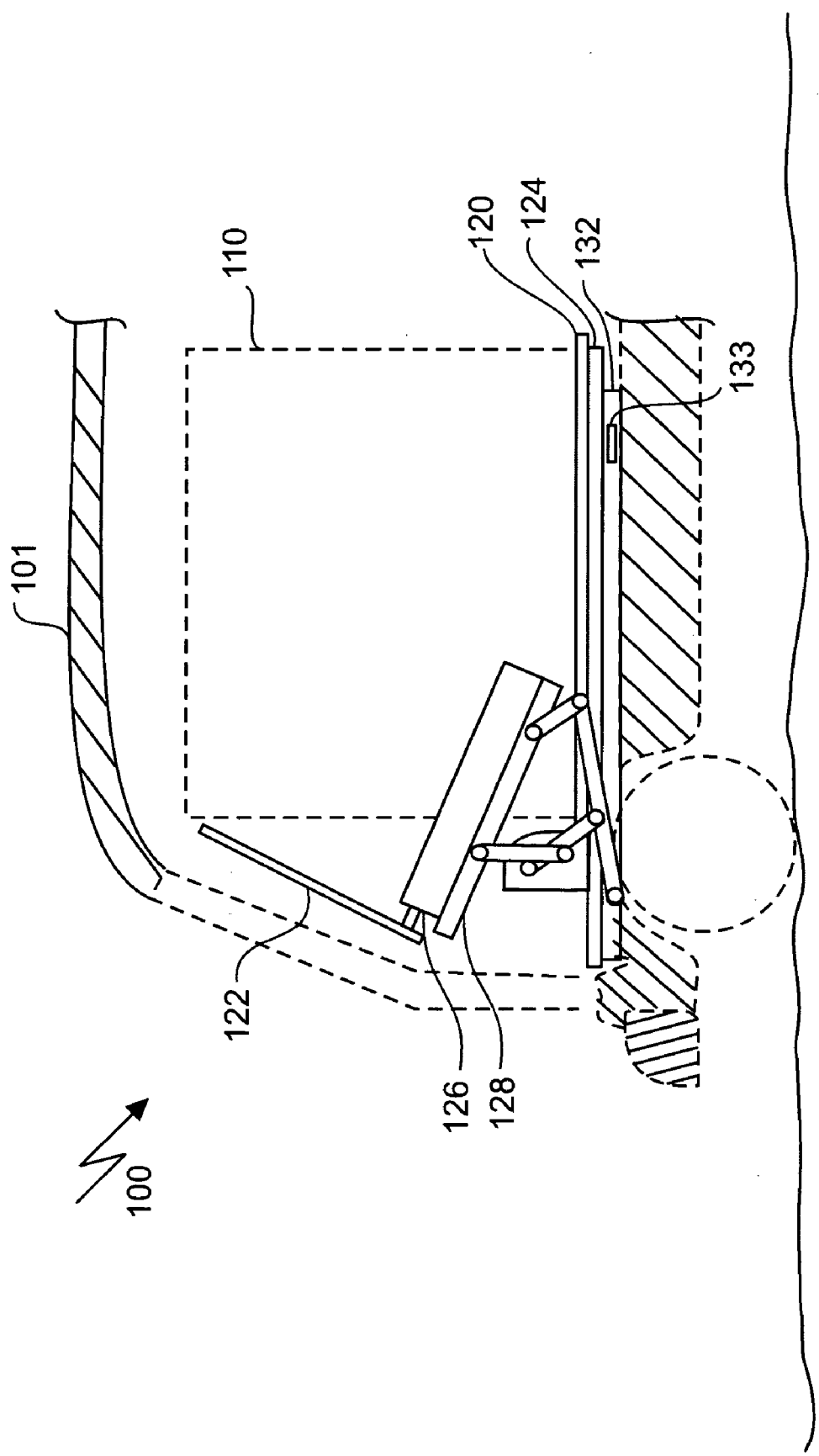

Referring to FIGS. 1a to 1d and 2a to 2d, simplified block diagrams of a preferred embodiment of an inside vehicle lift 100 according to the invention is shown. The block diagram in FIGS. 1a to 1d and 2a to 2d illustrate a side view and a rear view, respectively, of the inside vehicle lift 100 in four different stages of operation. A major problem in designing an inside vehicle lift is bridging gap G between a rear door opening 104 of vehicle 101 and a location behind a rear end of bumper 108—approx. 16 inches including some additional space for a trailer hitch—while maximizing the room provided for a load 110 inside loading space 102. This problem is overcome in the design of the inside vehicle lift 100 according to the invention by using a translational movable load platform 120, which is horizontally movable between a first position—the load platform being disposed on a lift support base 122 as shown in FIGS. 1a and 1b—and a second position—the load platform being disposed on an extension unit 124 as shown in FIGS. 1c and 1d. After disposing the load 110 onto the load platform 120, shown in FIGS. 1a and 2a, the load platform 120 is lifted using left hand side and right hand side lift actuators 126 to a position where the lift support base 122 is level with the extension unit 124, shown in FIGS. 1b and 2b. When the lift support base 122 is level with the extension unit, the load platform 120 is horizontally moved onto the extension unit 124. After transferring the load platform 120, the lift unit comprising the lift support base 122, the lift actuators 126, and lift actuator supports 128, is moved into the loading space 102 as shown in FIGS. 1c and 2c through rotational and translational movement provided by gear mechanism 130 according to the invention, which will be described in detail below with respect to FIGS. 3a to 3d. In its final position inside the loading space 102, shown in FIGS. 1d and 2d, the lift unit is disposed such that the lift support base 122 is in close proximity to the rear door opening and oriented substantially vertical. For use of the lift 100 in vehicles having a rear door with an upper inclined portion such as minivans and SUVs, the lift unit is preferably disposed such that the lift support base 122 is placed in close proximity to the upper inclined portion of the rear door opening 104 and oriented substantially parallel thereto, as shown in FIG. 1d.

A base 132 of the inside vehicle lift 100 is attached to vehicle floor 106 with its rear end in close proximity to the bottom portion of the rear door opening 104, preferably using existing seat couplers. The use of the existing seat couplers obviates the need for modifications to the vehicle in order to install the inside vehicle lift 100. The base 132 is, for example, designed as a frame structure of rectangular shape comprising a mechanism such as a guide rail—not shown—for enabling translational movement of the extension unit 124 with respect to the base 132 and for providing balance of moments when the extension unit 124 is acting as a cantilever in loading position, as shown in FIG. 1b. Movement between the extension unit 124 and the guide rail is enabled, for example, through sliding movement using sliding surfaces or rolling movement using wheels. A drive mechanism for providing the translational movement of the extension unit 124 is preferably a toothed gear mechanism comprising a toothed wheel in communication with a toothed rack. The toothed wheel is driven using, for example, a 12V electric motor 133 powered by a car battery. Preferably, the electric motor and the toothed wheel are attached to the base 132 while the toothed rack is attached to the extension unit 124, thus reducing the height of the extension unit 124. As is evident to one of skill in the art, there are numerous different design possibilities for enabling the translational movement of the extension unit 124 such as, for example, a hydraulic cylinder. The toothed gear mechanism is preferred, however, for its simplicity and potential for light weight implementation.

Figure 3A:
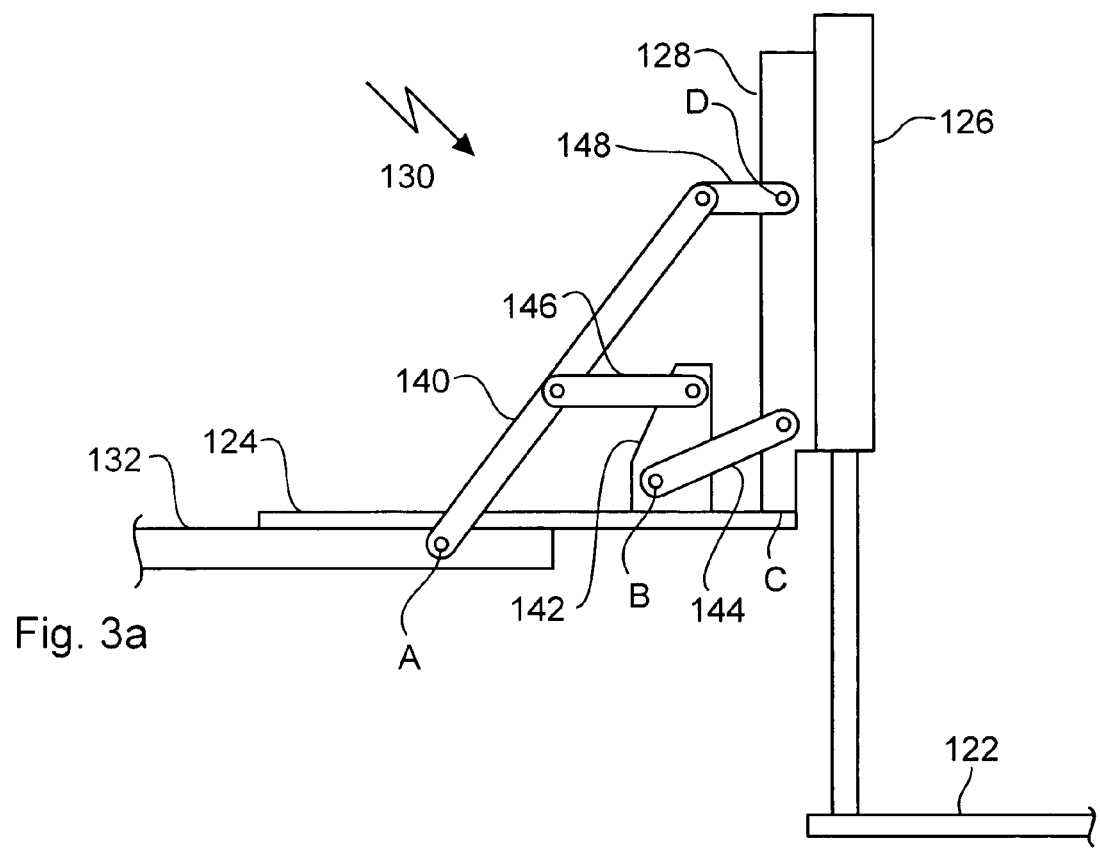
FIGS. 3a to 3d are simplified block diagrams schematically illustrating a side view of a preferred embodiment of a gear mechanism according to the invention for use in the inside vehicle lift shown in FIGS. 1a to 1d; and, FIGS. 4a to 4d are simplified block diagrams schematically illustrating a sideview of various embodiments of a drive mechanism for translationally moving a load platform of the inside vehicle lift according to the invention.
Figure 3B:
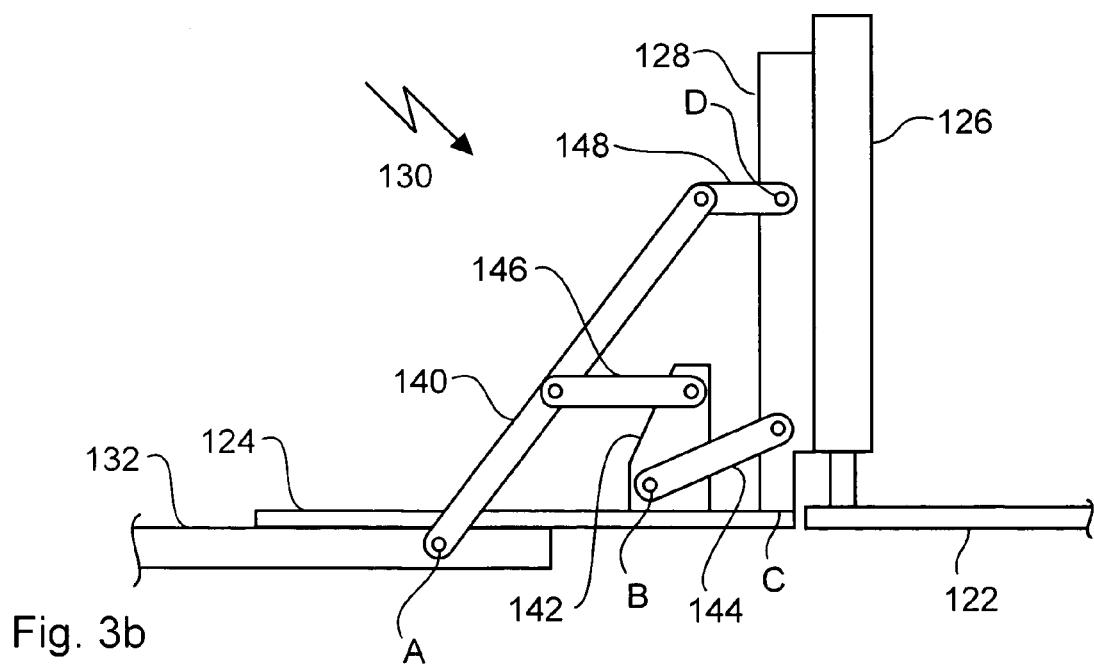
Figure 3C:
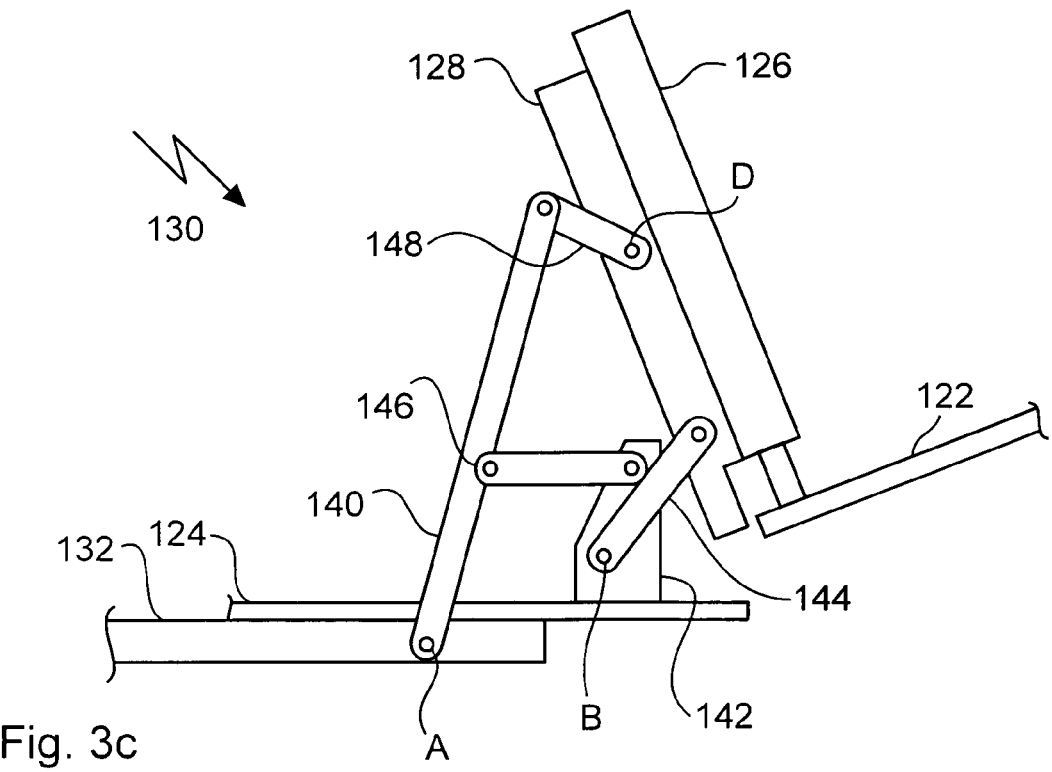
Figure 3D:
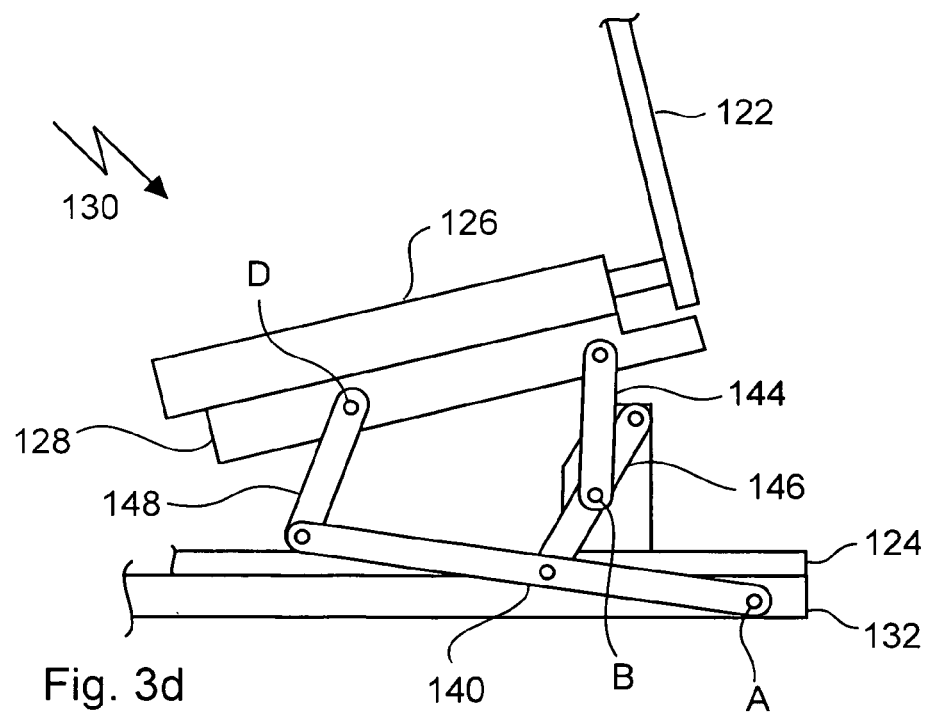

Referring to FIGS. 3a to 3d, the gear mechanism 130 according to the invention will now be described in more detail. FIGS. 3a to 3d are simplified block diagrams illustrating the gear mechanism 130 for deploying the lift unit at the four stages of operation of the inside vehicle lift shown in FIGS. 1a to 1d and 2a to 2d. Preferably, the gear mechanism shown in FIGS. 3a to 3d is implemented on the left hand side as well as on the right hand side of the base 132. Lever 140 is pivotally mounted to the base 132 at point A. Lever 146 is pivotally mounted to the lever 140 and pivotally connected to support 142, which is attached to the extension unit 124. Through action of lever 146, lever 140 is pivotally moved around point A in dependence upon the translational movement of the extension unit 124. The lift actuator support 128 is connected to the support 142 and the lever 140 via pivotally connected levers 144 and 148, respectively. Action of the lever 144 in response to the translational movement of the extension unit 124 provides translational movement of the lift actuator support 128 while allowing rotational movement of the same around point B. Action of the lever 140 in combination with the lever 148 provides the rotational movement of the lift actuator support 128. FIGS. 3a and 3b illustrate schematically the gear mechanism in a final loading position where the lift unit is disposed outside the rear of the vehicle with the lift actuator supports 128 and the lift actuators 126 being oriented substantially vertically for lifting or lowering the lift support base 122. It is to be noted that in this position the lift actuator support 128 is in contact with the extension unit 124 in point C for vertically supporting the lift unit. FIG. 3c illustrates schematically the gear mechanism 130 during deployment or retraction of the lift unit. Translational movement of the extension unit 124 in a direction pointing inside the vehicle for retracting the lift unit causes lever 146 to push on lever 140, thus pivotally moving the lever 140 around point A. The pivotal movement of the lever 140 causes the lever 148 to pull on the lift actuator support 128 and the resulting movement of the lift actuator support 128 in point D causes pivotal movement of the lever 144 around point B, thus the upper portion of the lift actuator support 128 is moved in a substantially downward direction while the lower portion of the lift actuator support 128 is moved in a substantially upward direction. The translational movement of the support 142 with the extension unit 124 causes the lever 144 to pull the lift actuator support 128 inside the vehicle. This action is continued until the final transport position, shown in FIG. 3d, is reached. Here, the extension unit 124 is completely retracted and disposed inside the vehicle, the lift actuator support 128 with the lift actuator 126 is oriented substantially horizontally, and the lift support base 122 is oriented substantially vertically. It is to be noted that the gear mechanism shown in FIG. 3d is highly beneficial for use in vehicles having a rear door with an inclined upper portion such minivans or SUVs. Here, the gear mechanism 130 ensures that the lift support base 122 is disposed at a distance above the floor 106 such that it is in close proximity to the upper inclined portion of the rear door and substantially parallel thereto, thus maximizing the space available for the load 110. Accordingly, for deploying the lift unit the above described moving action is reversed. The gear mechanism 130 according to the invention is highly advantageous by providing a simple solution for deploying and retracting the lift unit, which is easily implemented and allows use of light weight materials such as aluminum. Furthermore, coupling of the gear mechanism 130 to the base 132 as well as to the extension unit 124 enables deployment and retraction of the lift unit using the drive for moving the extension unit 124.

Alternatively, the extension unit is obviated by including the translational movement of the extension unit into the gear mechanism and translationally deploying a vertical support for the lift actuator support 128 for lifting and lowering. Further alternatively, the lift actuator support 128 is vertically supported using the rear door frame or the rear bumper of the vehicle. As is evident, there are other solutions for providing the moving action to deploy or retract the lift unit such as, for example, a combination of two hydraulic cylinders for providing translational and rotational movement. However, such a solution is not preferred due to its complexity and weight.

In the preferred embodiment hydraulic cylinders are used as the lift actuators 126. Hydraulic cylinders are readily available in many standard sizes and are the simplest drive for providing the vertical lifting action. Hydraulic pump, hydraulic control valves and hydraulic accumulator are, for example, disposed in the base 132 with the hydraulic cylinders being connected thereto via pressure hoses. Alternatively, the hydraulic pump, the hydraulic control valves and the hydraulic accumulator are disposed in the lift actuator support 128. Preferably, the hydraulic system is powered using 12V electric power supplied by the car battery. In an alternative embodiment a toothed gear comprising a toothed wheel drive and a toothed rack are employed for providing lifting action.

The lift support base 122 is made, for example, in the shape of a rectangular frame structure attached at the left hand side and the right hand side to the lift actuators 126, comprising at least a rail for supporting translational movement of the load platform 120 with respect to the lift support base 122. Alternatively, the lift support base 122 is a forklift-like structure comprising a bar attached to the two lift actuators and at least two forks attached to the bar for supporting the load platform and its translational movement. The width of the lift support is dimensioned for accommodating the load platform between the two lift actuators but having an overall width smaller than the rear door opening of the vehicle. The length L of the lift support base 122 is chosen to be sufficient for supporting the load platform 120 while fitting through the rear door opening during deployment and retraction of the lift unit. The lift support base 122 comprises a support mechanism, not shown, for providing balance of moments for the load platform 120, which is exceeding the lift support base 122 in a cantilever-like fashion during loading as shown in FIGS. 1a and 1b. Furthermore, the lift support base 122 comprises a stop mechanism for preventing the load platform 120 from translational movement other than transfer onto the extension unit 124.

Figure 4A:
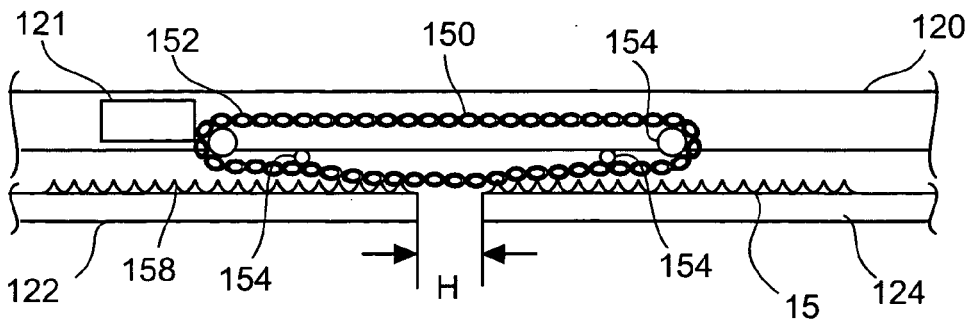
Figure 4B:
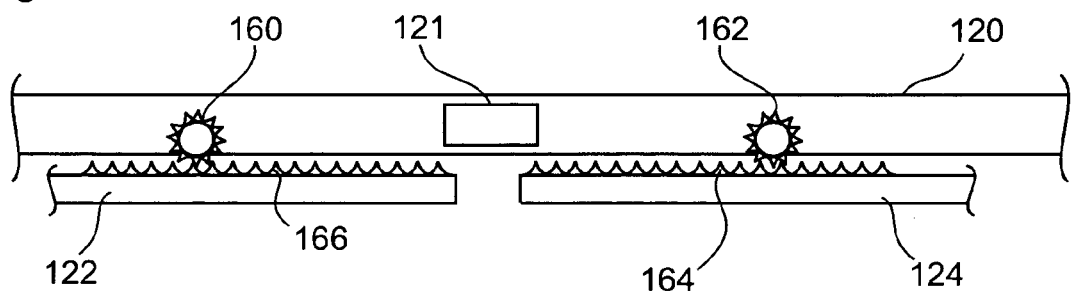
Figure 4C:
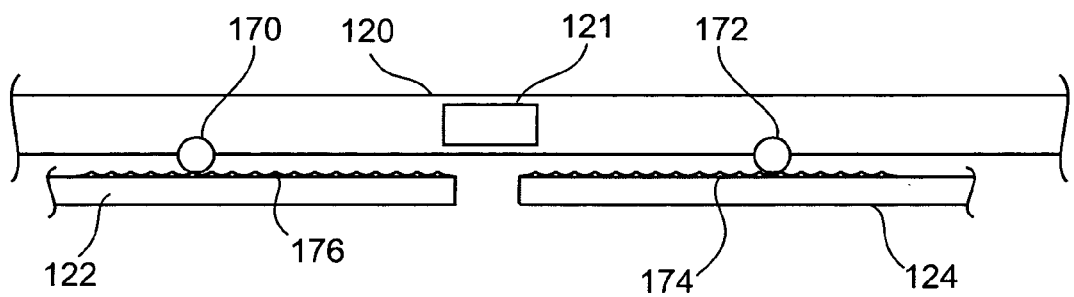
Figure 4D:
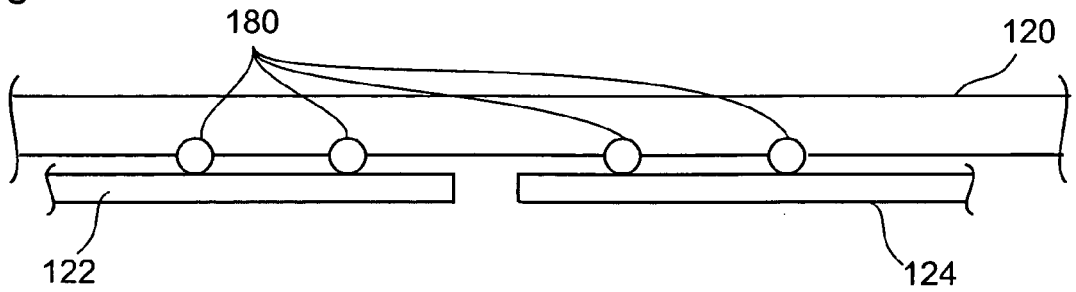

The load platform 120 is designed, for example, as a rectangular shaped frame structure comprising a drive mechanism for translational movement from the lift support base 122 onto the extension unit 124 or vice versa. The load platform 120 further comprises an upper surface, not shown, for receiving the load 110. Preferably, the upper surface is designed as a light weight structure in the form of, for example, a perforated sheet of a light weight material or a grid like structure. FIG. 4a illustrates schematically a chain drive for translationally moving the load platform 120. The chain drive comprises, for example, a chain 150, a drive sprocket wheel 152 and guide wheels 154. The chain 150 interacts with sprocket racks 156 and 158 of the extension unit 124 and the lift support base 122, respectively, for providing the translational moving action of the load platform when driven by the drive sprocket wheel 152. The drive sprocket wheel 152 is driven using, for example a 12V electric motor 121 powered by the car battery. Alternatively, shown in FIG. 4b, a toothed gear mechanism comprises drive toothed wheels 160 and 162, which interact with toothed racks 164 and 166 of the extension unit 124 and the lift support base 122, respectively. In order to transfer the load platform 120 from the extension unit 124 to the lift support base 122 or vice versa both toothed wheels 160 and 162 are driven and are disposed at a distance which is sufficiently larger than a gap H between the extension unit 124 and the lift support base 122. However, this embodiment is not preferred, because the toothed gear requires very small tolerances for positioning of the lift support base 122 with respect to the extension unit 124 in order to provide proper interaction of the drive toothed wheels 160 and 162 with the toothed racks 164 and 166 during transfer of the load platform 120 from the lift support base 122 to the extension unit 124 or vice versa. Further alternatively, shown in FIG. 4c, a friction drive mechanism comprises friction drive wheels 170 and 172, which interact with friction surfaces 174 and 176 of the extension unit 124 and the lift support base 122, respectively. In order to transfer the load platform 120 from the extension unit 124 to the lift support base 122, or vice versa, both friction drive wheels 170 and 172 are driven and are disposed at a distance which is sufficiently larger than the gap H between the extension unit 124 and the lift support base 122. An example for a friction drive is a rubber wheel interacting with a rough surface. The friction drive is advantageous for moving the load platform 120 due to its simplicity, its capability for light weight implementation, and large tolerance towards the positioning of the lift support base 122 with respect to the extension unit 124. Preferably, the drive mechanism is built into the load platform 120, thus avoiding the need for providing two drive mechanisms—one for the extension unit 124 and another for the lift support base 122—resulting in a simpler and weight saving solution. Yet further alternatively, shown in FIG. 4d, the load platform 120 comprises wheels or rollers 180 interacting with guide rails 184 and 186 of the extension unit 124 and the lift support base 122, respectively. This embodiment allows a user to move the load platform horizontally by hand. By not employing a drive mechanism this embodiment is very simple and weight saving, allowing increasing the weight of the load 110. This embodiment is beneficially employed for users capable of manually moving the load platform 120, for example, for delivery of heavy goods or for loading recreational vehicles such as ATVs or motorcycles.

The inside vehicle lift 100 is highly beneficial for installation in minivans and SUVs by providing simple installation using existing seat couplers, maximizing the size of the load and through light weight construction capabilities also maximizing the weight of the load. For example, for installation in a minivan the inside vehicle lift 100 allows use of hydraulic cylinders having a 24 inch stroke and provision of a load platform that is approximately 48 inches long and 30 inches wide. Furthermore, it is possible to design the inside vehicle lift 100 such that a total height of the extension unit 124 and the load platform 120 is approximately 2 inches or less, resulting in a height of the load of approximately 34 inches. Therefore, the inside vehicle lift 100 enables loading of a large number of different commercially available scooters without collapsing the backrest into minivans and SUVs. Another benefit of the inside vehicle lift 100 is its ease of operation. A user, for example, drives a scooter onto the load platform, secures the scooter to the load platform and operates the inside vehicle lift with a push on a button. The complete process of lifting and loading is then controlled using a control mechanism of the lift 100. After the loading process is finished the load is secure in its proper location inside the vehicle without interaction by the user.

Numerous other embodiments of the invention will be apparent to persons skilled in the art without departing from the spirit and scope of the invention as defined in the appended claims.

What is claimed is:

1. An inside vehicle lift for transferring a load through a rear door opening of a vehicle comprising:

a load platform for receiving the load, the load platform being horizontally movable between a loading position with the load platform being disposed behind a rear bumper of the vehicle and a transport position inside the vehicle;

a base for being attached inside the vehicle to a vehicle floor such that a rear end of the base is located in proximity to the rear door opening;

a lift unit comprising a lift support base and a left hand side and a right hand side lift actuator, the lift support base for supporting the load platform when disposed outside the vehicle, the lift support base being mechanically connection at a left hand side and at a right hand side to a left hand side lift actuator and a right hand side lift actuator, respectively, such that the lift support base is oriented substantially perpendicular to a longitudinal axis of each of the left and the right hand side lift actuator, the lift actuators for moving the lift support base with the load platform substantially straight in a substantially vertical direction between a first vertical position with the load platform being in close proximity to ground and a second vertical position suitable for horizontally moving the load platform into the vehicle;

a left hand side gear mechanism movably attached to a left hand side of the base and the left hand side lift actuator and a right hand side gear mechanism movably attached to a right hand side of the base and the right hand side lift actuator, respectively, the left hand side gear mechanism and the right hand side gear mechanism for providing translational and rotational movement of the lift unit through the rear door opening of the vehicle between a first position inside the vehicle with the lift support base being disposed in proximity to the rear door opening and oriented substantially vertical and a second position outside the vehicle with the lift support base and the lift actuators being disposed behind the rear bumper and the lift support base oriented substantially horizontal; and, an extension unit being movably attached to the base for substantially straight movement in a substantially horizontal direction between a first position where the extension unit is completely inside the vehicle and a second position where a portion of the extension unit is moved through the rear door opening, wherein the left hand side gear mechanism and the right hand side gear mechanism are connected to a left hand side and a right hand side of the extension unit, respectively, and wherein the left hand side gear mechanism and the right hand side gear mechanism are driven by the movement of the extension unit, and wherein the left hand side gear mechanism and the right hand side gear mechanism each comprise:

a first lever pivotally connected to the base;

a second lever pivotally connected to the first lever and pivotally connected to a lever support mounted to the extension unit, the second lever for pivotally moving the first lever in dependence upon movement of the extension unit;

a third lever pivotally connected to the lever support and pivotally connected to a bottom portion of the lift actuator for providing substantially translational movement to the lift actuator; and, a fourth lever pivotally connected to the first lever and pivotally connected to a top portion of the lift actuator for providing substantially rotational movement to the lift actuator.

2. An inside vehicle lift for transferring a load through a rear door opening of a vehicle as defined in claim 1, further comprising a toothed gear drive for providing the movement of the extension unit.

3. An inside vehicle lift for transferring a load through a rear door opening of a vehicle as defined in claim 2, wherein the toothed gear drive is driven by an electric motor powered by a battery of the vehicle.

4. An inside vehicle lift for transferring a load through a rear door opening of a vehicle as defined in claim 1, further comprising a drive mechanism for horizontally moving the load platform.

5. An inside vehicle lift for transferring a load through a rear door opening of a vehicle as defined in claim 4, wherein the drive mechanism is driven by an electric motor powered by a battery of the vehicle.

6. An inside vehicle lift for transferring a load through a rear door opening of a vehicle as defined in claim 5, wherein the drive mechanism comprises a chain drive interacting with a toothed rack.

7. An inside vehicle lift for transferring a load through a rear door opening of a vehicle as defined in claim 6, wherein the drive mechanism comprises a friction drive.

8. An inside vehicle lift for transferring a load through a rear door opening of a vehicle as defined in claim 1, wherein the load platform is supported by wheels and manually movable.

9. An inside vehicle lift for transferring a load through a rear door opening of a vehicle as defined in claim 1, wherein each of the lift actuators comprises a hydraulic cylinders.

10. An inside vehicle lift for transferring a load through a rear door opening of a vehicle as defined in claim 1, wherein the lift actuator comprises a lift actuator support for being in mechanical contact with the extension unit for providing vertical support to the lift unit when disposed outside the vehicle for loading.

11. An inside vehicle lift for transferring a load through a rear door opening of a vehicle as defined in claim 1, wherein the lift support base being disposed in proximity to an upper inclined portion of the rear door opening and oriented substantially parallel thereto.

12. A method for transferring a load through a rear door opening of a vehicle comprising:
    disposing a lift unit comprising a lift support base and a left hand side and a right hand side lift actuator behind a rear bumper of the vehicle with the lift support base being in close proximity to ground, the lift support base supporting a load platform thereupon, the lift support base being mechanically connected at a left hand side and at a right hand side to the left hand side lift actuator and the right hand side lift actuator, respectively, such that the lift support base is oriented substantially perpendicular to a longitudinal axis of each of the left and the right hand side lift actuator, the left hand side and the right hand side lift actuator being movably attached to a left hand side and a right hand side of a base via a left hand side gear mechanism and a right hand side gear mechanism, respectively, the base being attached inside the vehicle to a vehicle floor such that a rear end of the base is located in proximity to the rear door opening, and wherein the left hand side gear mechanism and the right hand side gear mechanism are connected to a left hand side and a right hand side of an extension unit, respectively, the extension unit being horizontally movable with respect to the base;
    disposing the load on the load platform;
    using the left hand side and the right hand side lift actuator lifting the lift support base with the load platform substantially straight in a substantially vertical direction to a vertical position suitable for moving substantially straight in a substantially horizontal direction the load platform into the vehicle;
    moving the load platform with the load substantially straight in a substantially horizontal direction from the lift support base disposed behind the rear bumper of the vehicle through the rear door opening into the vehicle;
    using the left and right hand side gear mechanism, translationally and rotationally moving the lift support base and the lift actuators through the rear door opening to a position inside the vehicle where the lift support base is disposed in proximity to the rear door opening and oriented substantially vertical; and,
    moving the extension unit from a first position where a rear portion of the extension unit is disposed outside the rear door opening to a second position where the complete extension unit is disposed within the vehicle, wherein the load platform is moved onto the extension unit.

13. A method for transferring a load through a rear door opening of a vehicle as defined in claim 12, wherein the lift support base is moved such that the lift support base is disposed in proximity to an inclined upper portion of the rear door opening and oriented substantially parallel thereto.

* * * * *